(12) United States Patent
Weinstein (10) Patent No.: US 12,360,383 B2
(45) Date of Patent: Jul. 15, 2025

(54) PLANARIZED CRYSTALLINE FILMS FOR DIFFRACTIVE OPTICS

(71) Applicant: Applied Materials, Inc., Santa Clara, CA (US)

(72) Inventor: Michael Alexander Weinstein, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 857 days.

(21) Appl. No.: 17/533,487

(22) Filed: Nov. 23, 2021

(65) Prior Publication Data

US 2022/0163810 A1 May 26, 2022

Related U.S. Application Data

(60) Provisional application No. 63/117,777, filed on Nov. 24, 2020.

(51) Int. Cl.
| | | |
|---|---|---|
| *G02B 27/10* | (2006.01) | |
| *G02B 1/10* | (2015.01) | |
| *G02B 5/18* | (2006.01) | |
| *G02B 27/42* | (2006.01) | |
| *G02B 6/12* | (2006.01) | |

(52) U.S. Cl.
CPC ............ *G02B 27/106* (2013.01); *G02B 1/10* (2013.01); *G02B 5/18* (2013.01); *G02B 27/4205* (2013.01); *G02B 2006/12166* (2013.01)

(58) Field of Classification Search
None
See application file for complete search history.

(56) References Cited

U.S. PATENT DOCUMENTS

| | | |
|---|---|---|
| 5,500,077 A | 3/1996 | Nishibayashi et al. |
| 5,937,275 A | 8/1999 | Munzel et al. |
| 5,976,683 A | 11/1999 | Liehrr et al. |
| 9,997,555 B2 * | 6/2018 | Christophersen ...... G02B 6/136 |
| 11,650,403 B2 * | 5/2023 | Sharma .................. H01S 5/026 359/708 |
| 2004/0043260 A1 | 3/2004 | Nadaud et al. |
| 2011/0039112 A1 | 2/2011 | Itatani et al. |
| 2018/0045953 A1 * | 2/2018 | Fan ........................ G02B 1/002 |
| 2018/0224574 A1 | 8/2018 | Lee et al. |

(Continued)

FOREIGN PATENT DOCUMENTS

| | | |
|---|---|---|
| JP | 2000052476 A | 2/2000 |
| KR | 20160032218 A | 3/2016 |

(Continued)

OTHER PUBLICATIONS

European Search Report issued to patent application No. 21899011.7 on Sep. 19, 2024.

(Continued)

*Primary Examiner* — Robert E. Tallman
(74) *Attorney, Agent, or Firm* — Patterson + Sheridan, LLP (57) ABSTRACT

Optical device films and methods of forming optical device films having a RMS surface roughness less than about 2.2 µin and a refractive index greater than 2.0 are provided. In one embodiment, an optical device film is provided and includes a crystalline or nano-crystalline material having a refractive index greater than 2.0. A top surface of the optical device film has a root-mean-square (RMS) surface roughness less than about 2.2 microinches (µin).

17 Claims, 6 Drawing Sheets

(56) References Cited

U.S. PATENT DOCUMENTS

| | | | |
|---|---|---|---|
| 2020/0096833 A1* | 3/2020 | Lee | G02B 5/1866 |
| 2020/0132894 A1* | 4/2020 | Stephens | G02B 1/14 |
| 2020/0233124 A1 | 7/2020 | Guo et al. | |
| 2022/0128817 A1* | 4/2022 | Singh | B29D 11/00769 |

FOREIGN PATENT DOCUMENTS

| | | |
|---|---|---|
| TW | 201606335 A | 2/2016 |
| WO | 2013172461 A1 | 11/2013 |
| WO | 2018140651 A1 | 8/2018 |
| WO | 2019006076 A1 | 1/2019 |
| WO | 2020131783 A1 | 6/2020 |
| WO | 2020163561 A1 | 8/2020 |

OTHER PUBLICATIONS

International Search Report/ Written Opinion issued to PCT/US2021/0606506 on Mar. 17, 2022.

Ganesh V et al: "Sn-doped ZnO nanocrystalline thin films with enhanced linear and nonlinear optical properties for optoelectronic applications", Journal of Physics and Chemistry of Solids, Pergamon Press, London, GB, vol. 100, Oct. 1, 2016 (Oct. 1, 2016), pp. 115-125, XP029802924, ISSN: 0022-3697, DOI: 10.1016/J.JPCS.2016.09.022 abstract; figure 6(b).

Dalapati Goutam Kumar et al: "Transparent 5-7 heat regulating (THR) materials and coatings for energy saving window applications: Impact of materials design, micro-structural, and interface quality on the THR performance", Progress in Materials Science, Pergamon Press, GB, vol. 95, Feb. 17, 2018 (Feb. 17, 2018), pp. 42-131, XP085378412, ISSN: 0079-6425, Doi: 10.1016/J.PMATSCI.2018.02.007 p. 75, 1. 2-3; Fig. 4(a)-(d).

European Search Report issued to patent application No. 21899011.7 on Dec. 19, 2024.

Korean Office Action issued to patent application No. 10-2023-7021336 on Apr. 9, 2025.

Taiwan Office Action issued to patent application No. 110143683 on Apr. 23, 2025.

\* cited by examiner

PLANARIZED CRYSTALLINE FILMS FOR DIFFRACTIVE OPTICS

CROSS-REFERENCE TO RELATED APPLICATIONS

This application claims benefit of U.S. Provisional Patent Application No. 63/117,777, filed Nov. 24, 2020, which is herein incorporated by reference in its entirety.

BACKGROUND

Field

Embodiments of the present disclosure generally relate to optical devices for augmented, virtual, and mixed reality. In particular, embodiments described herein relate to optical device films and methods of forming optical device films having a root-mean-square (RMS) surface roughness less than about 2.2 microinches (μin) and a refractive index greater than about 2.0.

Description of the Related Art

Optical devices may be used to manipulate the propagation of light by spatially varying structural parameters (e.g., shape, size, orientation) of structures of the optical devices formed on a substrate. The optical devices provide a spatially varying optical response that molds optical wavefronts as desired. These structures of the optical devices alter light propagation by inducing localized phase discontinuities (i.e., abrupt changes of phase over a distance smaller than the wavelength of the light). These structures may be composed of different types of materials, shapes, or configurations on the substrate and may operate based upon different physical principles.

The optical devices may include optical device structures or optical device layers disposed on a substrate. In some instances, the optical device structures or optical device layers have a RMS surface roughness greater than 2.2, which may reduce the functionality of the optical devices.

Accordingly, what is needed in the art are improved optical device films and methods of forming optical device films.

SUMMARY

Optical device films and methods of forming optical device films having a RMS surface roughness less than about 2.2 μin and a refractive index greater than 2.0 are provided. In one embodiment, an optical device film is provided and includes a crystalline or nano-crystalline material having a refractive index greater than about 2.0. A top surface of the optical device film has a RMS surface roughness less than about 2.2 μin.

In another embodiment, an optical device is provided and includes a plurality of optical device structures disposed on a substrate. The optical device structures include a crystalline or nano-crystalline material and have a top surface with a RMS surface roughness less than about 2.2 μin.

In another embodiment, an optical device is provided and includes a first crystalline optical device film disposed on a top surface of a substrate. The first crystalline optical device film has a refractive index greater than 2.0, and a top surface of the first crystalline optical device film has a RMS surface roughness less than about 2.2 μin. A first metal-containing layer is disposed on the top surface of the first crystalline optical device film, and a second crystalline optical device film is disposed on a top surface of the first metal-containing layer. The second crystalline optical device film has a refractive index greater than 2.0, and a top surface of the second crystalline optical device film has a RMS surface roughness less than about 2.2 μin. A second metal-containing layer is disposed on the top surface of the second crystalline optical device film.

In yet another embodiment, a method is provided that includes depositing an optical device layer on a substrate, depositing a planar coating on the optical device layer, the planar coating having an etch rate matched or substantially matched to the etch rate of the optical device layer, and performing one or more of an etch process, an ion or neutral beam shaping process, or a chemical mechanical polishing (CMP) process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices for augmented, virtual, and mixed reality. In particular, embodiments described herein relate to optical device films and methods of forming optical device films having a RMS surface roughness less than about 2.2 μin and a refractive index greater than about 2.0. The optical devices formed from the optical device film include optical device structures with a RMS surface roughness less than about 2.2 μin and a refractive index greater than about 2.0.

Figure 1A:
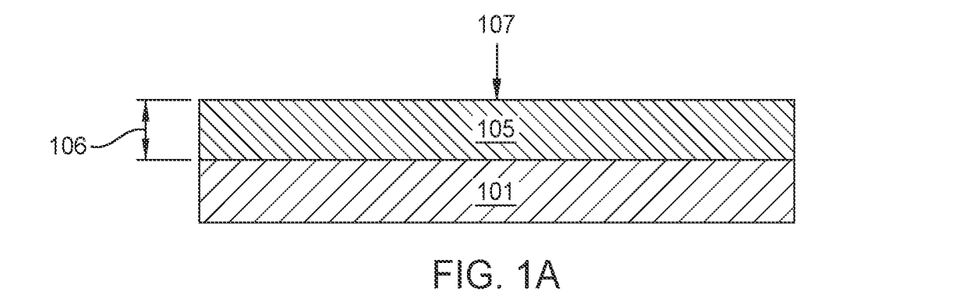
FIG. 1A is a schematic, cross-sectional view of an optical device film according to embodiments.

FIG. 1A is a schematic, cross-sectional view of an optical device film 105 according to embodiments. An optical device film 105 is disposed on a substrate 101. The optical device film 105 is fabricated according to the method 300 described herein. The substrate 101 may be any suitable substrate on which an optical device may be formed. In some embodiments, the substrate 101 is a silicon (Si) containing substrate. It is also contemplated that the substrate 101 may be an indium (In), gallium (Ga), germanium (Ge), or nitrogen (N) containing substrate. Alternatively or additionally, the substrate 101 may be a layered substrate. The optical device film 105 has a film thickness 106 and a top surface 107. The optical device film 105 is crystalline or nano-crystalline and has a refractive index greater than 2.0. In some embodiments, which can be combined with other embodiments, the refractive index is between 2.0 and 2.5. In some embodiments, the crystalline or nano-crystalline material is one or more of titanium oxide, silicon oxide, silicon nitride, zirconium oxide, niobium oxide, or polycrystalline diamond. The top surface 107 of the optical device film 105 has a RMS surface roughness value of less than about 2.2 microinches (μin).

Figure 1B:
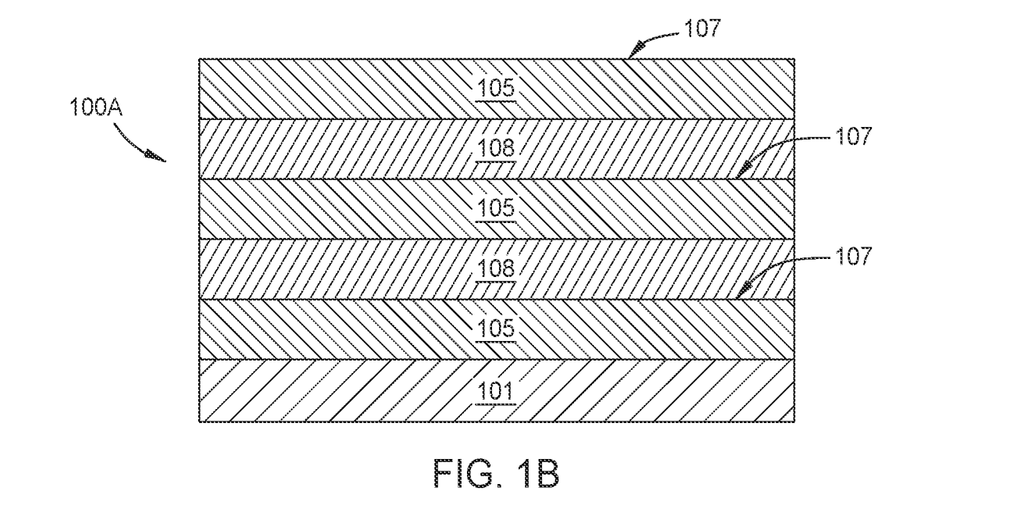
FIG. 1B is a schematic, cross-sectional view of an optical device according to embodiments.

FIG. 1B is a schematic, cross-sectional view of an optical device 100A according to embodiments. Alternating layers of the optical device film 105 formed through the method 300 described herein and a metal-containing layer 108 are disposed on the substrate 101. Any suitable number of layers may be disposed on the substrate 101, e.g., 5 total layers including the optical device films 105 and the metal-containing layers 108. In some embodiments, the metal-containing layer 108 is a reflective metallic material, such as aluminum (Al), silver (Ag), or gold (Au), among others. Deposition of the metal-containing layers 108 on the optical device films 105 is enhanced by the RMS surface roughness value of less than 2.2 μin of the top surface 107 of the optical device films 105 in accordance with the method 300.

Figure 1C:
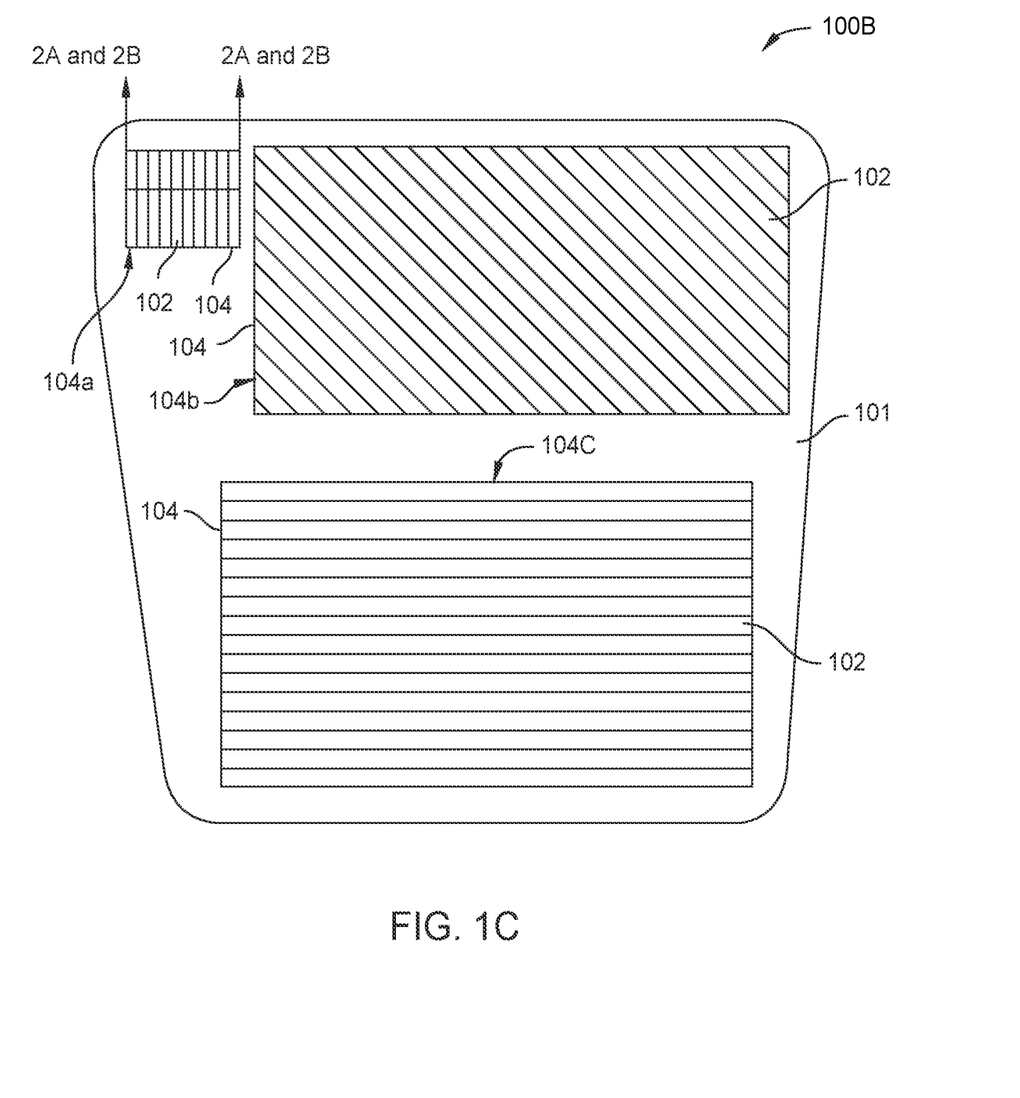
FIGS. 1C and 1D are schematic, top views of an optical device according to embodiments.
Figure 1D:
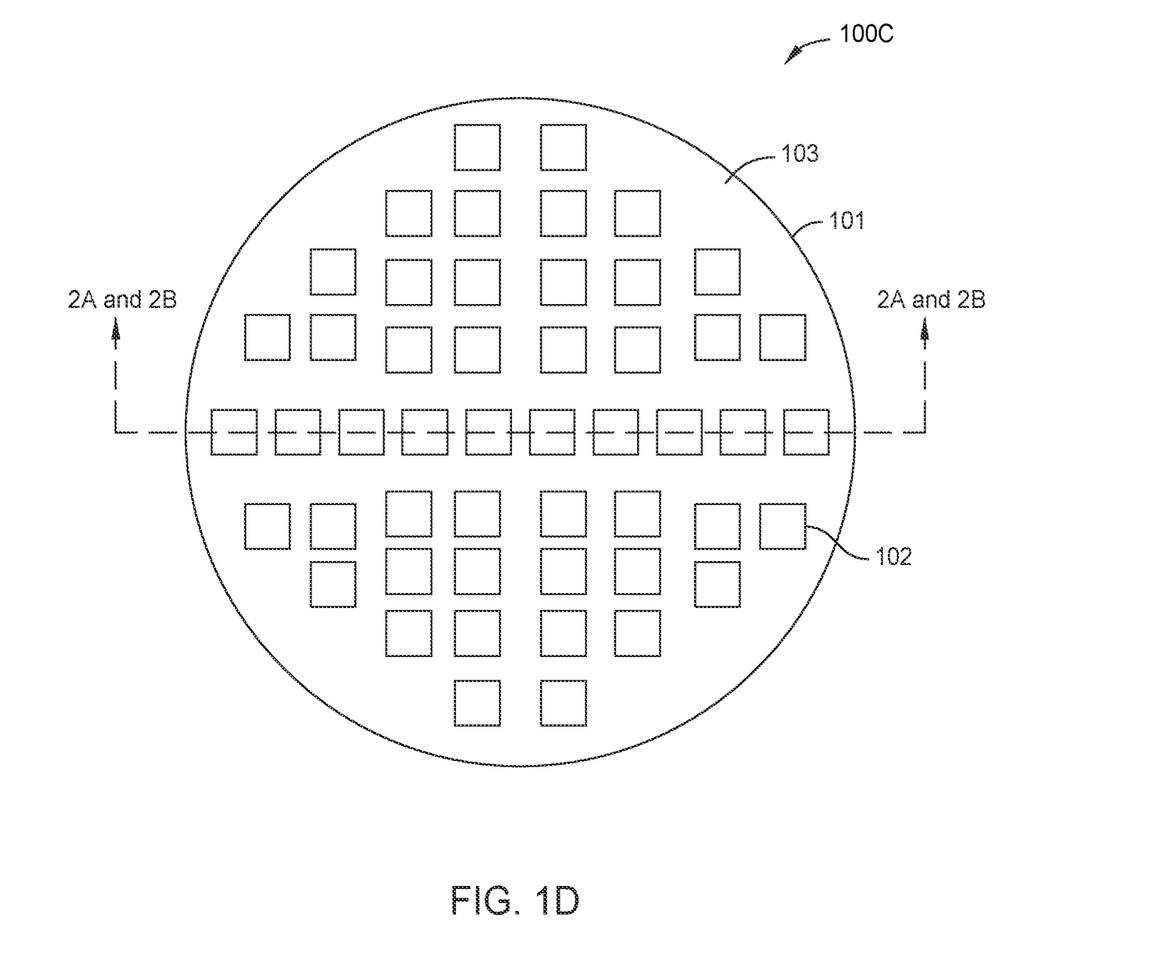

FIG. 1C is a schematic, top view of an optical device 100B according to embodiments. FIG. 1D is a schematic, top view of an optical device 100C according to embodiments. In some embodiments, which can be combined with other embodiments, the optical device 100B is a waveguide combiner, such as an augmented reality waveguide combiner. In other embodiments, which can be combined with other embodiments, the optical device 100C is a flat optical device, such as a metasurface. The optical devices 100B and 100C are formed from one or more optical device films 105 formed according to method 300 described herein. The optical devices 100B and 100C include a plurality of optical device structures 102 disposed on a surface 103 of the substrate 101. The optical device structures 102 may be nanostructures having sub-micron dimensions, e.g., nano-sized dimensions.

In some embodiments, which can be combined with other embodiments, regions of the optical device structures 102 correspond to one or more gratings 104, such as a first grating 104A, a second grating 104B, and a third grating 104C. In some embodiments, which can be combined with other embodiments, the optical devices 100B are waveguide combiners that include at least the first grating 104A corresponding to an input coupling grating and the third grating 104C corresponding to an output coupling grating. The waveguide combiners according to embodiments, which can be combined with other embodiments, include the second grating 104B corresponding to an intermediate grating. While FIG. 1D depicts the optical device structures 102 as having square or rectangular shaped cross-sections, the cross-sections of the optical device structures 102 may have other shapes including, but not limited to, circular, hexagonal, octagonal, triangular, elliptical, regular polygonal, irregular polygonal, and/or irregular shaped cross-sections. In some embodiments, which can be combined with other embodiments, the cross-sections of the optical device structures 102 on a single optical device 100C are different.

Figure 2A:
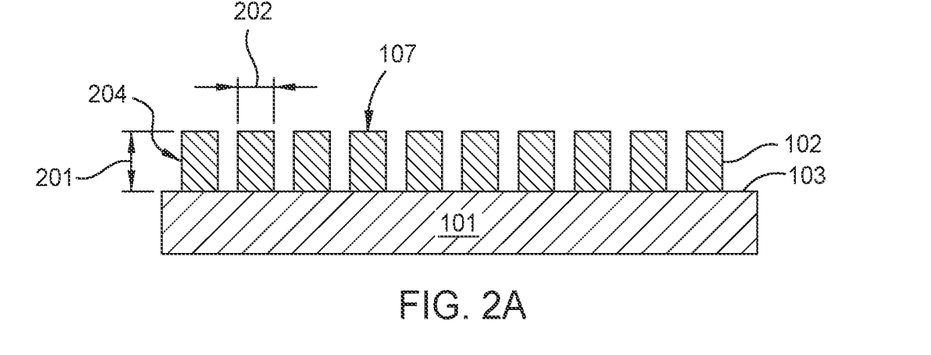
FIGS. 2A and 2B are schematic, cross-sectional views of a portion of an optical device according to embodiments.
Figure 2B:
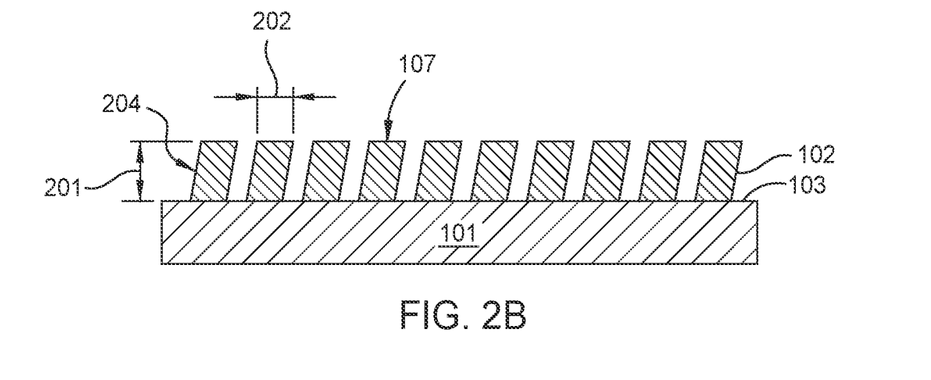

FIGS. 2A and 2B are schematic, cross-sectional views of a portion of an optical device according to embodiments. FIGS. 2A and 2B depict a portion of the optical device 100B or the optical device 100C. The portion of the optical device 100B and/or 100C includes the plurality of optical device structures 102 disposed on the surface 103 of the substrate 101.

Each optical device structure 102 of the plurality of optical device structures 102 has a top surface 107, adjacent sidewalls 204, an optical device structure depth 201, and an optical device structure width 202. The optical device structures 102 are formed by patterning an optical device film, for example the optical device film 105. The top surface 107 has a RMS surface roughness less than 2.2 μin. In some embodiments, which may be combined with other embodiments described herein, the optical device structure width 202 corresponds to the width or the diameter of each optical device structure 102, depending on the cross-section of each optical device structure 102. In some embodiments, which can be combined with other embodiments, at least one optical device structure width 202 may be different from another optical device structure width 202. In another embodiment, which can be combined with other embodiments described herein, each optical device structure width 202 of the plurality of optical device structures 102 is substantially equal.

Each optical device structure 102 of the plurality of optical device structures 102 has a depth 201. As shown in FIGS. 2A-2B, the depth 201 of each optical device structure 102 of the plurality of optical device structures 102 are equal, but it is contemplated that they could be different.

The optical device structures 102 are formed from the optical device film 105. In some embodiments, which can be combined with other embodiments, the optical device film 105 is formed from a crystalline or nano-crystalline material having a refractive index greater than about 2.0, e.g., between 2.0 and 2.5, e.g., between 2.0 and 2.2. The crystalline or nano-crystalline material is one or more of titanium oxide, silicon oxide, niobium oxide, or polycrystalline diamond. The top surface 107 of the optical device film 105 has a RMS surface roughness value of less than 2.2 μin.

As shown in FIG. 2A, which can be combined with other embodiments, the plurality of optical device structures 102 are binary, i.e., the sidewalls 204 are oriented normal to the substrate 101, e.g., surface 103 of the substrate 101. As shown in FIG. 2B, which can be combined with other embodiments, the plurality of optical device structures 102 are angled, i.e., the sidewalls 204 are slanted relative to the substrate 101, e.g., surface 103 of the substrate 101.

Figure 3:
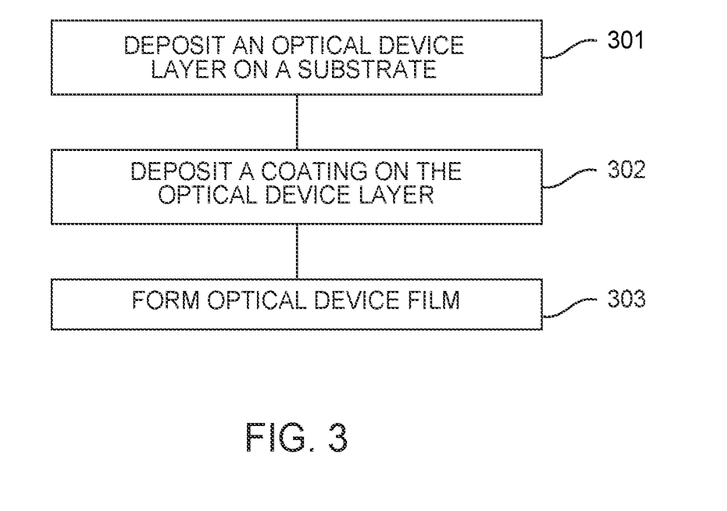
FIG. 3 is a flow diagram of a method of forming an optical device film according to embodiments.
Figure 4A:
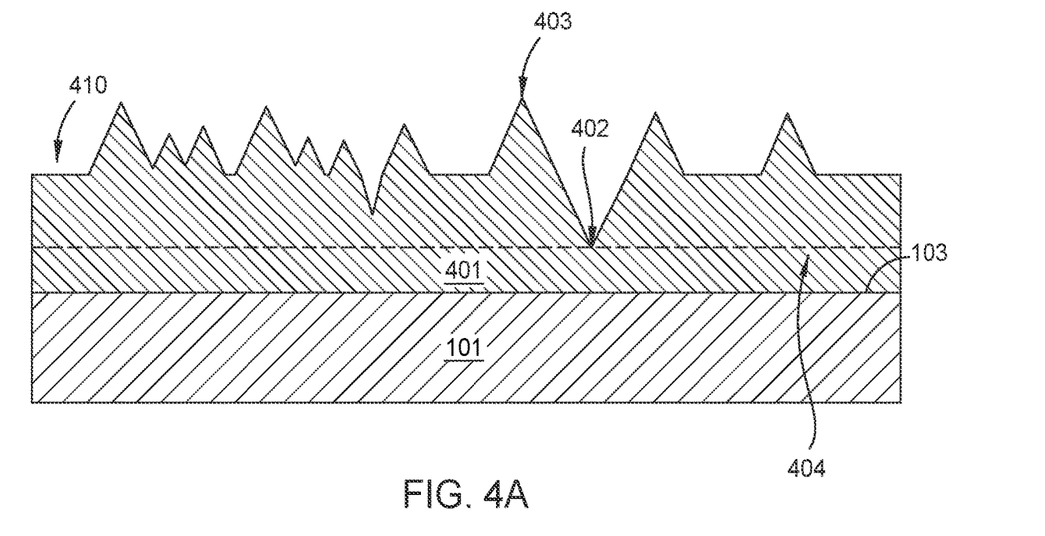
FIGS. 4A-4D are schematic, cross-sectional views of a substrate during a method of forming an optical device film according to embodiments.

FIG. 3 is a flow diagram of a method 300 for forming an optical device film as shown in FIGS. 4A-4D. FIGS. 4A-4D are schematic, cross-sectional views of a substrate 101 during the method 300. At operation 301, as shown in FIG. 4A, an optical device layer 401 is deposited on a substrate 101. The optical device layer 401 is deposited on the substrate 101 through a spin-on coating process, a liquid material pour casting process, a liquid spray coating process, a dry powder coating process, a screen printing process, a doctor blading process, a physical vapor deposition (PVD) process, a chemical vapor deposition (CVD) process, a flowable chemical vapor deposition (FCVD) process, a plasma-enhanced chemical vapor deposition (PECVD) process, an epitaxial vapor deposition process, or an atomic layer deposition (ALD) process. The optical device layer 401 has a refractive index greater than about 2.0, e.g., between 2.0 and 2.5, e.g., between 2.0 and 2.2.

The optical device layer 401 is crystalline or nano-crystalline and has a top surface 410 with a RMS surface roughness greater than 2.2 μin. The top surface 410 of the optical device layer 401 has a RMS roughness value greater than 2.2 µin due to the onset of crystalline or nano-crystalline formations in the optical device layer 401 and on the top surface 410 of the optical device layer 401. The optical device layer 401 is a crystalline or nano-crystalline material such as one or more of titanium oxide, silicon oxide, niobium oxide, or polycrystalline diamond. The crystalline or nano-crystalline formations of the optical device layer 401 result in the formation of a point of minimum thickness 402 and a point of maximum thickness 403 of the optical device layer 401. The point of minimum thickness 402 of the optical device layer 401 extends to a plane 404. The plane 404 is substantially parallel to the surface 103 of the substrate 101.

At operation 302, a planar coating is deposited over the optical device layer 401. In certain embodiments, the planar coating has a substantially planar top surface, while a bottom surface thereof may not be planar (Words). The planar coating is one of a coating 405, a carbon coating 406, or a nanoparticle coating 407. Each of the coating 405, the carbon coating 406, and the nanoparticle coating 407 have an etch rate matched or substantially matched to the etch rate of the optical device layer 401. In some embodiments, which can be combined with other embodiments, the etch selectivity of the planar coating to the optical device layer 401 is 1:1. The matched or substantially matched etch rates of the planar coating and optical device layer 401 provide for the formation of an optical device film 105 that has the RMS surface roughness of less than 2.2 µin after the planar coating. In some examples, a portion of the optical device layer 401, such as a portion of the top surface 410 with a RMS roughness value greater than about 2.2 µin, is removed at operation 303. During processing to remove the planar coating, and in certain embodiments, a portion of the optical device layer 401, such as a portion of the top surface 410 with a RMS roughness value greater than 2.2 µin, at operation 303, the matched or substantially matched etch rates of the planar coating and the optical device layer 401 prevents under-etching and/or over-etching of the optical device layer 401 while ensuring the planar coating is removed and the optical device film 105 is formed from the optical device layer 401.

Figure 4B:
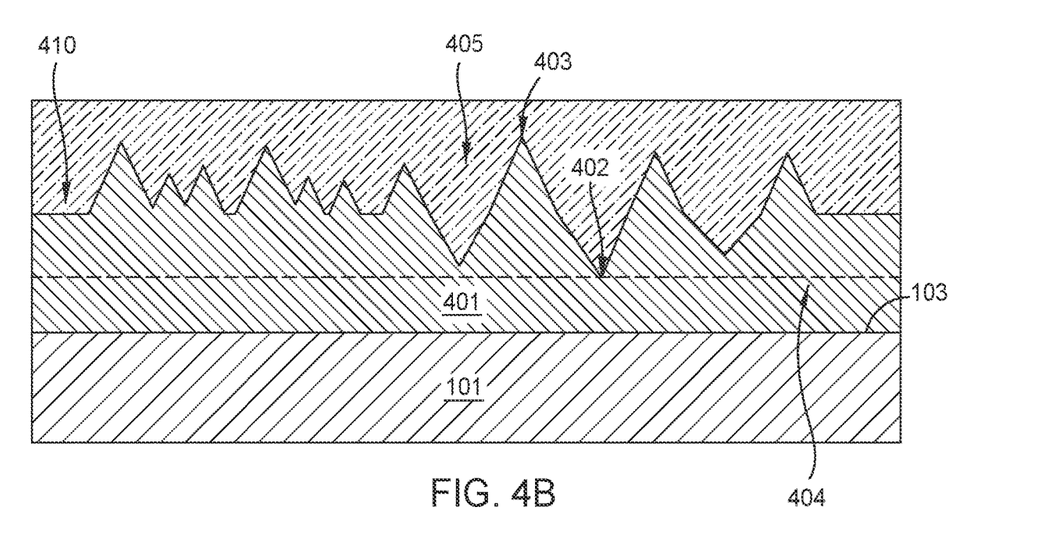
Figure 4C:
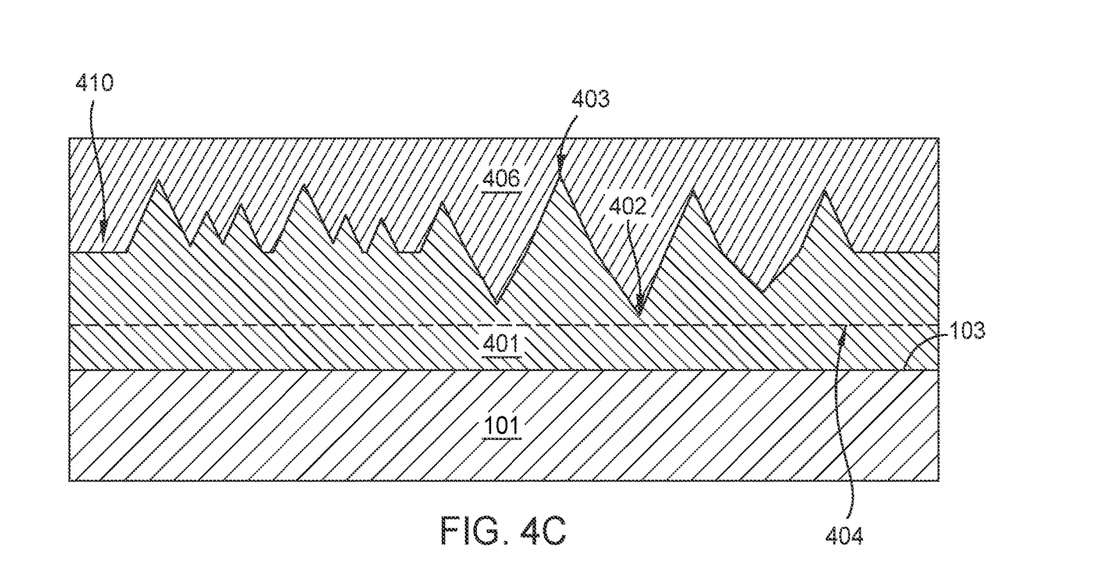
Figure 4D:
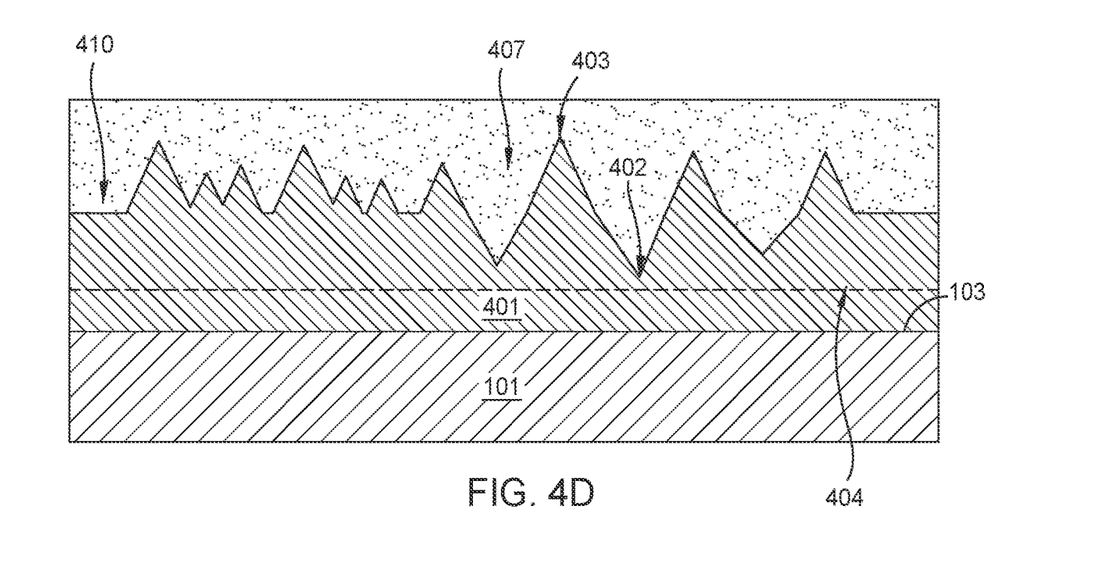

The coating 405, as shown in FIG. 4B, is deposited by a FCVD, a PVD, or a spin-on coating process. The coating 405 includes one or more of silicon, titanium, niobium, or zirconium containing-materials deposited by the FCVD, the PVD, or the spin-on coating process. For example, the coating 405 includes an oxide material, such as silicon oxide, titanium oxide, niobium oxide, or zirconium oxide. The FCVD, the PVD, or the spin-on coating process provides for a planar coating with the etch rate matched or substantially matched to the etch rate of the optical device layer 401. The carbon coating 406, as shown in FIG. 4C, is amorphous or substantially amorphous. The amorphicity of the carbon coating 406 provides for the etch rate matched or substantially matched to the etch rate of the optical device layer 401. For example, etch rate is matched or substantially matched by increasing semi-amorphous carbon crystalline grain size in the carbon coating 406. The nanoparticle coating 407, as shown in FIG. 4D, is a nanoparticle layer or a nanoparticle-containing layer. The nanoparticle coating 407, as shown in FIG. 4D, includes one or more of silicon, niobium, zirconium, or titanium containing-materials. For example, the nanoparticle coating 407 includes an oxide of silicon, niobium, zirconium, or titanium. The nanoparticles of the nanoparticle coating 407 provide for the etch rate matched or substantially matched to the etch rate of the optical device layer 401.

At operation 303, as shown in FIGS. 1A and 1B, the optical device film 105 is formed by performing one or more of an etch process, an ion or neutral beam shaping process, or a chemical mechanical polishing (CMP) process. For example, the etch process may include at least one of ion beam etching (IBE), e-beam etching, reactive ion etching (RIE), directional RIE, plasma etching, or thermal atomic layer etching. It is also contemplated to use ion implantation in place of or in addition to the etch process. Performing one or more of the etch process, the ion or neutral beam shaping process, or the CMP process removes the planar coating and reduces the thickness of the optical device layer 401 to form the optical device film 105 with the thickness 106. In some embodiments, which can be combined with other embodiments, the thickness 106 corresponds to the plane 404, i.e., point of minimum thickness 402 of the optical device layer 401. In some embodiments, which can be combined with other embodiments, the thickness 106 after performing one or more of the etch process, the ion or neutral beam shaping process, or the CMP process is less than the plane 404. For example, the thickness 106 may be less than about 2.0 micrometers (µm). The resulting optical device film 105 having a RMS surface roughness less than about 2.2 µin and a refractive index greater than about 2.0 may be further processed to form the optical device 100A or the optical device structures 102 of the optical device 100B, 100C.

In summation, optical device films and methods of forming optical device films having a RMS surface roughness less than about 2.2 µin and a refractive index greater than about 2.0 are described herein. A planar coating is deposited over a device layer having an etch rate matched or substantially matched to the etch rate of the optical device layer. The matched or substantially matched etch rates of the planar coating and optical device layer provide for the formation of an optical device film that has a RMS surface roughness of less than 2.2 µin after the planar coating is removed and the thickness of the optical device layer is reduced. During processing to remove the planar coating and reduce the thickness of the optical device layer, the matched or substantially matched etch rates prevents under-etching and/or over-etching of the optical device layer while ensuring that the planar coating is removed and that the optical device film is formed from the optical device layer.

While the foregoing is directed to embodiments of the present disclosure, other and further embodiments of the disclosure may be devised without departing from the basic scope thereof, and the scope thereof is determined by the claims that follow.

What is claimed is:

1. An optical device, comprising:
a plurality of optical device structures disposed on a substrate, the optical device structures comprising a single layer of crystalline or nano-crystalline material and having a top surface has a root-mean-square (RMS) surface roughness less than about 2.2 microinches (µin).

2. The optical device of claim 1, wherein the optical device is a waveguide combiner.

3. The optical device of claim 2, wherein the optical device structures correspond to a grating of the waveguide combiner.

4. The optical device of claim 1, wherein the optical device is a flat optical device.

5. The optical device of claim 1, wherein the single layer of crystalline or nano-crystalline material comprises one or more of titanium oxide, silicon oxide, niobium oxide, and polycrystalline diamond.

6. The optical device of claim 1, wherein the single layer of crystalline or nano-crystalline material has a refractive index greater than 2.0.

7. A waveguide, comprising:
a first grating of first optical device structures disposed over a substrate, the first optical device structures having:
a first crystalline optical device layer disposed on a top surface of the substrate, the first crystalline optical device optical device layer having a refractive index greater than 2.0, a top surface of the first crystalline optical device layer having a root-mean-square (RMS) surface roughness less than about 2.2 microinches (pin); and
a first metal-containing layer disposed on the top surface of the first crystalline optical device layer; and
a second grating of second optical device structures disposed over a substrate, the second optical device structures having:
a second crystalline optical device layer disposed on the top surface of the first metal-containing layer, the second crystalline optical device film having the refractive index greater than 2.0, the top surface of the second crystalline optical device film having the RMS surface roughness less than about 2.2 pin; and
a second metal-containing layer disposed on the top surface of the second crystalline optical device layer.

8. The waveguide of claim 7, wherein the first crystalline optical device layer comprises one or more of titanium oxide, silicon oxide, niobium oxide, and polycrystalline diamond.

9. The waveguide of claim 7, wherein the first metal-containing layer and the second metal-containing layer each comprise one or more of aluminum, silver, and gold.

10. A method, comprising:
depositing an optical device layer on a substrate;
depositing a planar coating on the optical device layer, the planar coating having an etch rate matched or substantially matched to the etch rate of the optical device layer;
performing one or more of an etch process, an ion or neutral beam shaping process, or a chemical mechanical polishing (CMP) process; and
forming at least one grating of a waveguide, the grating having:
a single crystalline optical device layer having a refractive index greater than 2.0 and a top surface with a root-mean-square (RMS) surface roughness less than about 2.2 microinches (μin).

11. The method of claim 10, wherein the performing the one or more of the etch process, the ion or neutral beam shaping process, or the CMP process comprises removing the planar coating and removing a portion of the single crystalline optical device layer.

12. The method of claim 10, wherein the etch process comprises at least one of ion beam etching (IBE), e-beam etching, reactive ion etching (RIE), directional RIE, plasma etching, or thermal atomic layer etching.

13. The method of claim 10, wherein the single crystalline optical device layer comprises one or more of titanium oxide, silicon oxide, niobium oxide, or polycrystalline diamond.

14. The method of claim 10, wherein the planar coating is an amorphous or substantially amorphous carbon coating.

15. The method of claim 10, wherein the planar coating is a nanoparticle layer or a nanoparticle-containing layer.

16. The method of claim 10, wherein the planar coating is deposited by a flowable chemical vapor deposition (FCVD), a physical vapor deposition (PVD), or a spin-on coating process.

17. The method of claim 10, wherein the planar coating includes one or more of silicon, titanium, niobium, or zirconium containing-materials.

* * * * *

UNITED STATES PATENT AND TRADEMARK OFFICE
CERTIFICATE OF CORRECTION

PATENT NO. : 12,360,383 B2
APPLICATION NO. : 17/533487
DATED : July 15, 2025
INVENTOR(S) : Michael Alexander Weinstein Page 1 of 1

It is certified that error appears in the above-identified patent and that said Letters Patent is hereby corrected as shown below:

On the Title Page

On page 2, in Column 2, under "Other Publications", Line 13, delete "Fig." and insert -- Figs. --.

In the Claims

In Column 7, Line 14, in Claim 7, delete "device optical device" and insert -- device --.

In Column 7, Line 19, in Claim 7, delete "(pin);" and insert -- (μin); --.

In Column 7, Line 30, in Claim 7, delete "pin;" and insert -- μin; --.

Signed and Sealed this
Tenth Day of February, 2026

John A. Squires
*Director of the United States Patent and Trademark Office*